United States Patent [19]

Weiser

[11] Patent Number: 4,461,949
[45] Date of Patent: Jul. 24, 1984

[54] ELECTRIC HOT WATER HEATER ENERGY SAVER

[76] Inventor: John R. Weiser, R.D. #2, Box 419, Sunbury, Pa. 17801

[21] Appl. No.: 387,090

[22] Filed: Jun. 10, 1982

[51] Int. Cl.³ .......................... F24H 1/20; H05B 1/02
[52] U.S. Cl. .................................... 219/334; 219/489
[58] Field of Search ............... 219/334, 327, 489, 492, 219/493, 329; 236/46 R

[56] References Cited

U.S. PATENT DOCUMENTS

| 1,560,528 | 11/1925 | Baum | 219/334 |
| 2,077,250 | 4/1937 | Miller | 236/46 R |
| 2,238,600 | 4/1941 | Reifenberg . | |
| 2,266,148 | 12/1941 | Biebel | 219/334 |
| 2,266,149 | 12/1941 | Biebel | 219/334 |
| 2,266,150 | 12/1941 | Biebel | 219/334 |
| 2,266,246 | 12/1941 | Osterheld | 219/334 |
| 2,266,247 | 12/1941 | Osterheld | 219/334 |
| 2,266,249 | 12/1941 | Osterheld | 219/334 |
| 2,266,250 | 12/1941 | Osterheld | 219/334 |
| 2,266,253 | 12/1941 | Osterheld | 219/334 |
| 2,266,254 | 12/1941 | Osterheld | 219/334 |
| 2,315,773 | 4/1943 | Couzens . | |
| 2,383,675 | 8/1945 | Osterheld . | |
| 2,407,453 | 9/1945 | Rougier | 219/334 |
| 2,415,966 | 2/1947 | Osterheld | 219/329 |
| 2,420,189 | 5/1947 | Osterheld | 219/329 |
| 2,428,525 | 10/1947 | Osterheld | 219/329 |
| 3,052,765 | 9/1962 | Everard et al. . | |
| 3,979,060 | 9/1976 | Tierce | 236/46 R |
| 4,299,096 | 11/1981 | Van Camp | 236/46 R |
| 4,317,987 | 3/1982 | Fieldman | 219/493 |

FOREIGN PATENT DOCUMENTS 1278105 6/1972 United Kingdom ................ 219/334

OTHER PUBLICATIONS

Paragon Catalog, "Paragon Time Controls," p. 41.
Dayton Catalog, "Electric Water Heater Time Switch".
Smith, Dave, "The Family Handyman", Sep. 1980, vol. 30, No. 7, 211th Edition.

Primary Examiner—Roy N. Envall, Jr.
Assistant Examiner—Teresa J. Walberg
Attorney, Agent, or Firm—Michael F. Petock

[57] ABSTRACT

An electric hot water heater energy saver incorporates an electrically operated timer which is provided with contacts preferably by a timer motor. The contacts are operable to open and close an electric circuit, preferably several times during a twenty-four hour period. Electrical energy, typically from a 220 volt line, is connected to the timer motor and separately to the electrical contacts. The electrical contacts are connected in series with the electrical energy source and electrical heater element of an electric hot water heater. A step down transformer provides a signal voltage. A contactor is provided with its contacts connected across the timer motor operated contacts. A switch, preferably located remotely in a living area, is connected in series with the signal voltage and when closed, operates the contactor to supply electrical energy to the hot water heater element by the timing of the timer motor. A method of conserving electrical energy in an electrically operated hot water heater forms a part of the invention.

12 Claims, 4 Drawing Figures

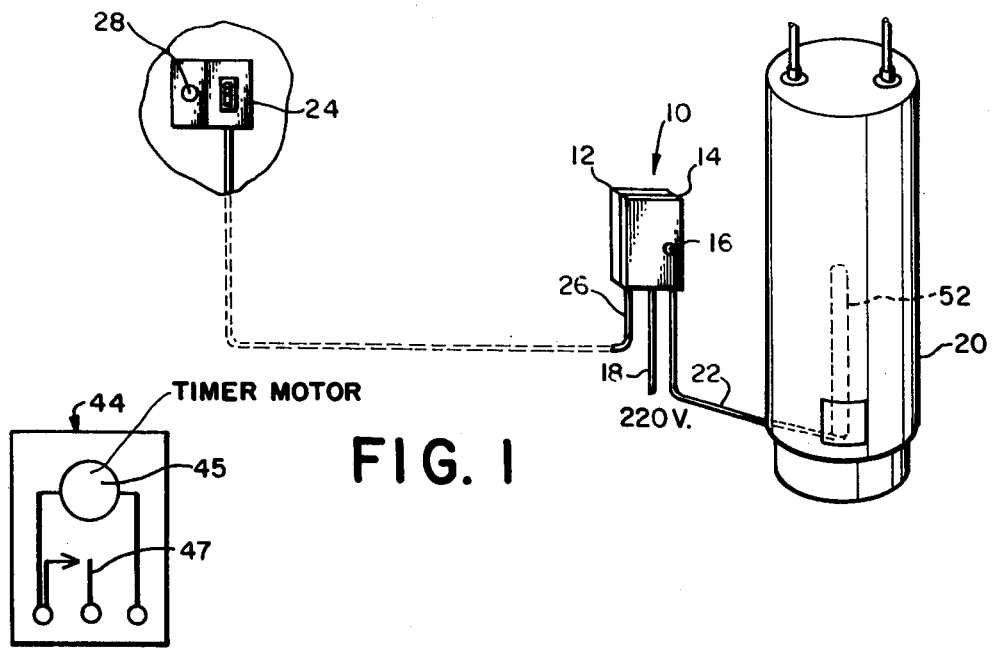
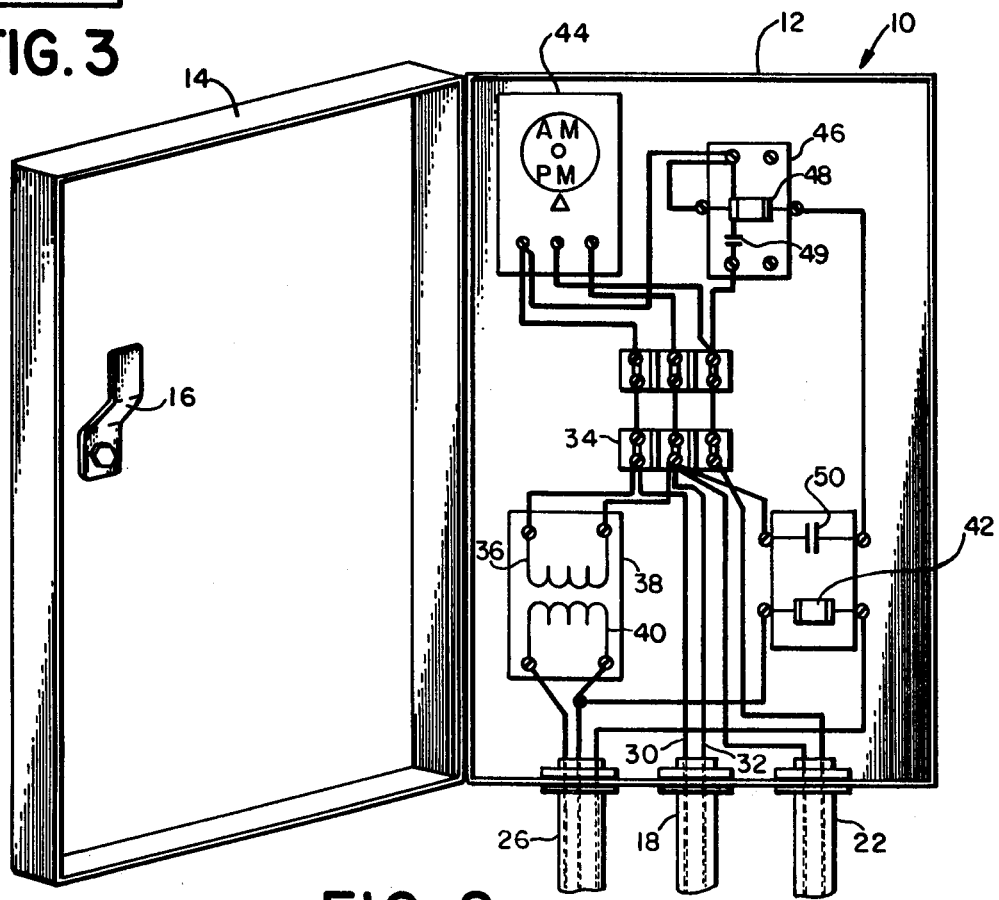

ELECTRIC HOT WATER HEATER ENERGY SAVER

BACKGROUND OF THE INVENTION

The present invention relates to an electric hot water energy saver. More particularly, the present invention relates to an electric hot water energy saver in which electrical energy may be switched off by a timer mechanism one or more times during a day, with the timer switching being bypassed or overridden from a remote location as desired without affecting the timer and its settings.

In recent years, the cost of energy has risen dramatically, including the cost of electrical energy. Furthermore, efforts have been made to conserve energy, and particularly to conserve energy where it is being expended without serving a useful purpose.

Electric time switches have been known in the past, for example, see U.S. Pat. No. 3,052,765. Furthermore, it has been known to connect such switches in series with an electric hot water heater. Switches of the type referred to are provided with a manual mechanical override. However these mechanical overrides must be physically reset at the time switch after each off-period. In fact, there is a predetermined period of time after the transition going from an on to an off state wherein the mechanical switch cannot be overridden. Furthermore, any such overriding of the time switch must be physically done at the time switch which is physically located near the electric hot water heater which contains the electrical heating element. Furthermore, the time switch unit contains 220 volts alternating current electricity. Whether or not there is any real danger to a housewife or child utilizing the manual reset, there is certainly a potential danger and certainly a fear associated with this potential harm.

It has also been known in the past to connect a time-controlled switch in series with an electric hot water heater in order to limit demand on the public utility supply during periods of peak demand. For example, reference may be had to U.S. Pat. Nos. 1,560,528; 2,266,149; 2,407,453; 2,266,247; 2,415,966 and others. U.S. Pat. No. 1,560,528 issued to Baum appears to disclose a manually operated override switch in connection with its system of shutting off current to a hot water heater during periods of peak current demand, which is among the most likely times that a consumer would desire to use hot water. Baum does not disclose a remotely located low voltage switch which may be utilized to override the time controlled circuit in a positive manner to enable the heating of water during periods of unexpected need for hot water while at the same time providing a means for reducing the magnitude of the electrical energy bill to a consumer.

SUMMARY OF THE INVENTION

The present invention is directed to a method and an apparatus for enabling a consumer to reduce the amount of electrical consumption and therefore the cost of heating hot water, while at the same time providing a safe convenient and efficient manner of providing hot water as desired even though it falls outside of the normal hot water consumption pattern.

In accordance with the present invention, the electrical energy to the electric hot water heater may be turned off one or more times during a twenty-four hour day, preferably for two periods of time during the twenty-four hour day. In a typical day, a husband and wife may be employed from 8:00 a.m. to 5:00 p.m. with children in school from 8:00 a.m. to 4:00 p.m. They may typically retire at 11:00 p.m. and arise at 7:00 a.m. In this specific example, the hot water heater with the timer may be set to off for fifteen hours, allowing one hour of heating prior to use, a day without inconvenience to the family. This amounts to a 62.5% reduction in the on-time of electrical consumption. This is effectively in excess of 228 days per year of off time out of total of 365 days per year. The example given herein is for purposes of illustration only, and it is understood that the exact figures will vary depending upon the patterns of consumption. However, in accordance with the present invention, variation in the consumption pattern are easily accomodated without inconvenience to the consumer by easily operating a conveniently located override switch.

Briefly, in accordance with the present invention, a method of conserving electrical energy in an electrically operated hot water heater is provided. The steps of the method include connecting a timer motor provided with electrical contacts to an electrical supply and connecting the electrical contacts of the timer between the electrical supply and the electrical heating element of a hot water heater. The method further includes the setting of the contacts to turn off the electrical supply to the electrical heating elements of the hot water heater during at least one period of non-use of hot water during a twenty-four hour period and connecting of a contactor across the timer motor operated contact. Finally, the method includes connecting of switch means operable from a remote location to operate the contactor as desired to heat hot water by bypassing the timer motor operated contacts without affecting the timing of the timer motor.

Briefly and basically, the apparatus of the present invention includes an electric hot water heater energy saver comprising an electrically operated timer motor provided with electrical contacts operable by a timer motor, the contacts being operable to close and open an electrical circuit at least once a day. The apparatus further includes means for connecting a source of electrical energy to the timer motor and to the electrical contacts and means for connecting the contacts in series with an electrical heater element of an electric hot water heater element of an electric hot water heater. The apparatus further includes a means for producing a signal voltage of smaller magnitude than the magnitude of the voltage of the source of electrical energy and contactor means provided with contacts connected across the timer motor operated contacts. The apparatus includes switch means connected in series with the signal voltage and means for operating the contactor means whereby the effect of said timer motor operated contacts may be bypassed to operate said hot water heater element without affecting the timing of the timer motor. Preferably, switch means connected in series with signal voltage is located in a living space remote from the location from the timer and the hot water heating element.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 1 is a perspective view of an electric hot water heater energy saver system in accordance with the present invention.

FIG. 2 is an elevation view, partially in perspective, of the timer mechanism and related structure, excluding the remotely located switch and the electric hot water heating element in accordance with the present invention.

FIG. 3 is a schematic diagram of a timer in accordance with the present invention.

DETAILED DESCRIPTION OF THE PREFERRED EMBODIMENTS

Figure 4:
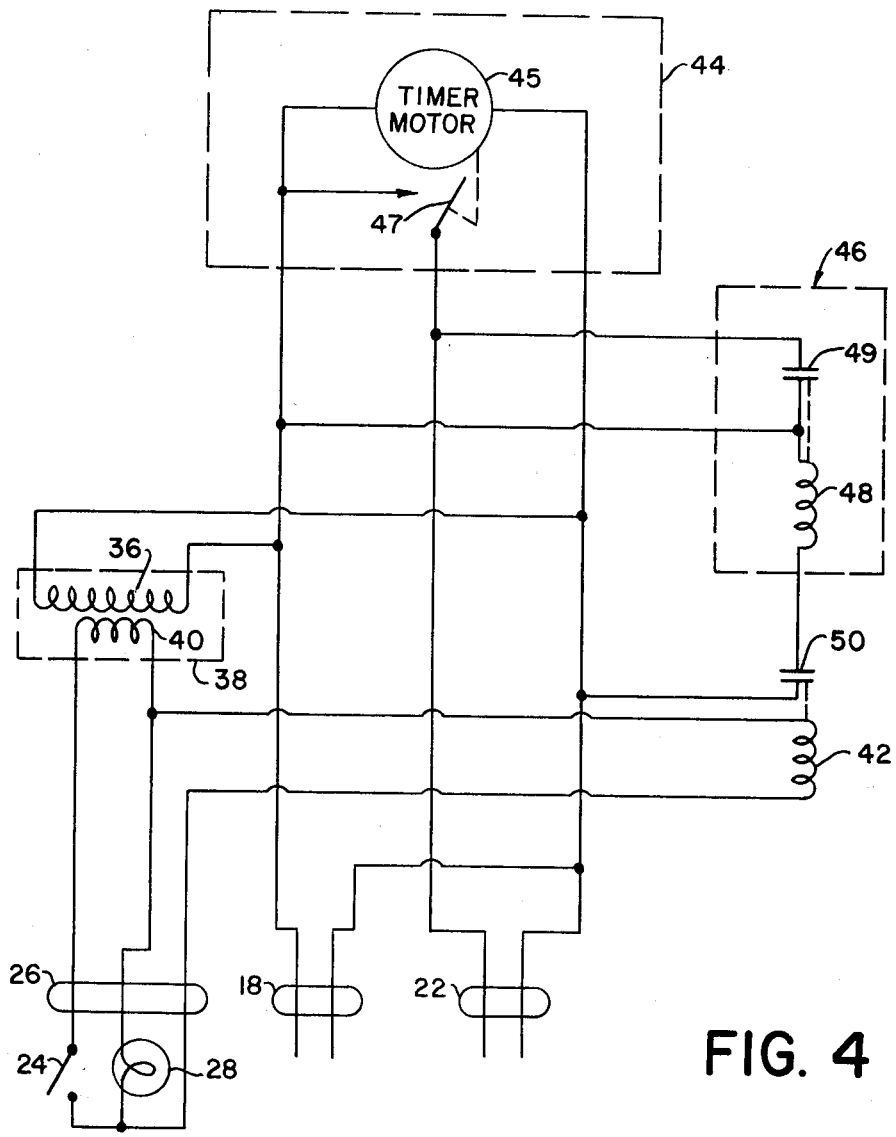

Referring now to the drawings in detail wherein like numerals indicate like elements, there is shown an electric hot water heater energy saver 10 in accordance with the present invention. For a better understanding of the present invention, simultaneous reference may be had to both FIGS. 1 and 2 in connection with the following description. The electric hot water heater energy saver 10 is enclosed within a housing 12 having an openable hinged door 14 which may preferably be provided with a lock 16.

The electric hot water heater energy saver is connected through a source of electrical energy via line 18. The source of electrical energy is preferably a 220 volt alternating current source. In the description which follows hereinafter, this source of electrical energy may be referred to as the 220 volt alternating current or 220 volt alternating current source with it being understood that this terminology may be utilized without in any way limiting the scope of the present invention as to use of other suitable alternating current voltages or other suitable electrical energy sources. The electric hot water heater energy saver 10 supplies the 220 volt alternating current in a time controlled manner, with convenient override of the timer mechanism, to electric hot water heater 20 via line 22. The timer control mechanism of electric hot water heater energy saver 10 may be overridden to provide electrical energy to electric hot water heater 20 via line 22 independent of the time or settings of electric hot water heater energy saver. This is provided by a switch 24 connected to electric hot water heater energy saver via line 26. Switch 24 may be preferably conveniently located at a remote location such as in a living area preferably such as in the kitchen of a residential unit. However, switch 24 may be located at any convenient remote location whether utilized in a residential, commercial or industrial application.

Referring now more particularly to FIGS. 2 and 4, there is shown line 18 connecting the source of electrical energy, typically 220 volts alternating current, to an electrical hot water heater energy saver 10. In a typical application, two phases of 110 volt alternating current are applied to lines 30 and 32. At the terminal block, 34, the alternating current voltage of line 18 is applied to the primary winding 36 of step down transformer 38 to produce a signal voltage, preferably of 24 volt alternating current, on secondary winding 40. The signal voltage produced in secondary winding 40 is supplied via line 26 to one side of switch 24 and to one side of relay coil 42.

The 220 volt alternating current is also applied via terminal block 34 to electrically operated timer 44. Electrically operated timer 44 may be one of a number of commercially available electrically operated timers, such as model number 4004-20V manufactured by Paragon Electric Company. However, it is understood that other suitable electrically operated timers may be utilized. Electrically operated timer 44 includes a timer motor 45 (FIG. 3) which is electrically connected to the source of electrical energy independent of timer contacts 47 being open or closed. In other words, the timer motor operates continuously. The contacts of timer 44 may be set by trippers for one or more periods of off time during a twenty-four hour day as is known in the art. Although a single pair of trippers with one off time period during a twenty-four hour day may be suitable for many purposes and is included within the scope of the present invention, preferably, two periods of off time during a twenty-four hour day period are provided by two separate sets of trippers. However, it is understood that in particular applications, more than two periods or less than two periods of off time may be provided during a twenty-four hour day. Contactor 46 includes electrical contacts 49 connected across the contacts of timer 44 to bypass the contacts of timer 44 when contactor 46 is energized. The coil 48 of contactor 46 is energized to close the contacts of contactor 46 when relay contacts 50 are closed by operation of relay coil 42. Relay coil 42 is energized by the closure of switch 24 which applies the signal voltage generated in the secondary winding 40 of step down transformer 38 via line 26. The closure of switch 24 also applies the signal voltage to signal light 28 which indicates that the timer contacts are being bypassed or overridden by the contactor circuit. In other words, when switch 24 is closed, the 220 volt alternating current is applied to electrical heating element 52 via the contacts of contactor 46 independent of the fact that the contacts of timer 44 may be open.

In summary, a suitable source of high voltage, such as 220 or 230 volts alternating current, is applied via line 18 to timer 44. Timer 44 has this voltage constantly applied to its timer motor 45 and the timer is initially set so that it keeps time in synchronism with the prevailing time in the area where it is being used. The timer is provided with one or more sets of trippers to open the contacts of the timer for one or more periods during the day. Preferably, in many applications, the timer will be provided with two sets of trippers to provide two off times during a twenty-four hour period. When the contacts 47 of timer 44 are closed, the 220 volt alternating current is applied via line 22 to the electrical heating element 52 of hot water heater 20. When the electrical contacts 47 of timer 44 are open, the 220 volt alternating current is disconnected from electrical heater element 52, unless override switch 24 is closed causing the signal voltage generated in step down transformer 38 to be applied to relay coil 42. The energization of relay coil 42 in this manner closes relay contact 50 which applies the 220 volt alternating current to contactor coil 48. The energization of contactor 48 in this manner closes the contacts 49 of contactor 46 which are connected in parallel across the contacts of timer 44 and applying the 220 volt alternating current to heater element 52 independent of whether the timer contacts 47 are open or closed. This condition of timer bypass or timer override is conveniently indicated by indicator light 28. The bypass switch 24 may be conveniently located at a remote location convenient to the consumer. When the consumer desires to use the hot water system at times not programmed for by timer 44, he or she does not have to go to the location of the hot water heater and does not have to expose himself or herself to a control box containing a high voltage, such as 220 or 230 volts alternating current. In many applications, the override switch 24 may be conveniently located in a living area, such as in the kitchen of a residence.

The present invention may be embodied in other specific forms without departing from the spirit or essential attributes thereof and, accordingly, reference should be made to the appended claims, rather than to the foregoing specification as indicating the scope of the invention.

I claim:

1. An electric hot water heater energy saver, comprising:
   an electrically operated timer provided with electrical contacts operated directly by a timer motor, said contacts being operable to close and open an electrical circuit at least once a day;
   means for connecting a source of electrical energy to said timer motor and to said electrical contacts;
   means for connecting said contacts in series between an electrical heater element of an electric hot water heater and said source of electrical energy;
   means for producing a signal voltage of smaller magnitude than the magnitude of the voltage of said source of said electrical energy;
   contactor means provided with contacts connected across said timer motor operated contacts;
   means for operating said contactor means; and
   manually operable switch means connected in series with said signal voltage and said means for operating said contactor means whereby the effect of said timer motor operated contacts may be bypassed to operate said hot water heater element without affecting the timing of said timer motor, said manually operable switch means adapted to be located at a location remote from said timer.

2. An electric hot water heater energy saver in accordance with claim 1 wherein said means for producing a signal voltage is a step down transformer.

3. An electric hot water heater energy saver in accordance with claim 1 wherein said source of electrical energy comprises an alternating current voltage of about 220 volts in magnitude.

4. An electric hot water heater energy saver in accordance with claim 1 wherein said means for operating said contactor means includes a relay, said relay being operable in response to said signal voltage as applied through said switch means and being provided with relay contacts for operation of said contactor.

5. An electric hot water heater energy saver in accordance with claim 1 wherein said switch means is located in a living space remote from the location of said timer and said hot water heating element.

6. An electric hot water heater energy saver in accordance with claim 1 wherein said timer is provided with means for closing and opening said electrical circuit a predetermined number of times each day.

7. An electric hot water heater energy saver in accordance with claim 1 including an indicator light for providing an indication that the timer motor operated contacts are bypassed in response to operation of said switch means.

8. A method of conserving electrical energy in an electrically operated hot water heater, comprising the steps of:
   connecting a timer motor provided with directly operated electrical contacts to an electrical supply;
   connecting the electrical contacts of the timer between the electrical supply and the electrical heating element of a hot water heater;
   setting the contacts to turn off the electrical supply to said electrical heating elements of said hot water heater during at least one period of non-use of hot water during a twenty-four hour period;
   connecting a contactor across the timer motor operated contacts;
   connecting manually operable switch means operable from a remote location to operate said contactor as desired to heat hot water by bypassing said timer motor operated contacts without affecting the timing of said timer motor.

9. A method of conserving electrical energy in an electrically operated hot water heater in accordance with claim 8 including the steps of providing means for and setting the contacts to turn off the electrical supply to said electric heating element of said hot water heater a predetermined number of times during a twenty-four hour period.

10. A method of conserving electrical energy in an electrically operated hot water heater in accordance with claim 8 including the step of selecting the setting of the contacts to turn off the electrical supply to said electrical heating element of said hot water heater during periods of anticipated non-use of hot water and the turning on of the electrical supply a predetermined period of time prior to the anticipated need for hot water.

11. A method of conserving electrical energy in an electrically operated hot water heater in accordance with claim 8 including a step of locating said switch means remotely in a living space.

12. A method of conserving electrical energy in an electrically operated hot water heater in accordance with claim 8 including the step of connecting an indicator light to said signal voltage means in series with said switch means for providing an indication that the timer motor operated contacts are bypassed in response to operation of said switch means.

* * * * *